United States Patent
Keller

[15] 3,685,841
[45] Aug. 22, 1972

[54] UNITIZED SEAL ASSEMBLY
[72] Inventor: Thomas Charles Keller, Canton, Ohio
[73] Assignee: The Timken Company, Canton, Ohio
[22] Filed: Nov. 5, 1970
[21] Appl. No.: 87,057

[52] U.S. Cl. ................................. 277/37, 277/47
[51] Int. Cl. ........................................ F16j 15/32
[58] Field of Search .................. 277/35, 37, 47–52, 277/153

[56] References Cited

UNITED STATES PATENTS

| | | | |
|---|---|---|---|
| 3,099,454 | 7/1963 | Walinski | 277/47 |
| 3,011,814 | 12/1961 | Rhoads et al. | 277/37 |
| 3,341,265 | 9/1967 | Paterson | 277/37 X |
| 3,561,770 | 2/1971 | Corsi | 277/37 X |

FOREIGN PATENTS OR APPLICATIONS

| | | | |
|---|---|---|---|
| 703,022 | 2/1965 | Canada | 277/37 |

Primary Examiner—Robert G. Nilson
Attorney—Gravely, Lieder & Woodruff

[57] ABSTRACT

A unitized seal assembly includes a seal case having a pair of spaced retaining walls between which a wear ring is disposed. The wear ring fits over a shaft and has spaced inner and outer walls joined by a connecting wall located adjacent to one of the retaining walls. The spacing between the inner and outer walls permits air to circulate freely along the outer wall to dissipate heat therefrom. A bumper ring is bonded to the connecting wall, and it has a plurality of circumferentially spaced bumper pads which project toward and are located opposite to one of the retaining walls. An elastomeric seal element is bonded to the opposite retaining wall, and it has sealing lips which engage the outer wall of the wear ring. The seal element also has a bumper ring provided with circumferentially spaced bumper pads which are positioned opposite the end edge of the outer wall on the wear ring. Thus, the two sets of bumper pads maintain the wear ring centered in the seal case as the seal assembly is installed in a housing or on a shaft.

12 Claims, 4 Drawing Figures

INVENTOR:
THOMAS C. KELLER
By Gravely, Lieder & Woodruff
ATTORNEYS.

UNITIZED SEAL ASSEMBLY

BACKGROUND OF THE INVENTION

This invention relates in general to seals and more particularly to a unitized seal assembly.

In unitized seal constructions the wear ring cannot be disengaged from the elastomeric seal lip which embraces it, and by reason of this fact unitized seals facilitate assembly and disassembly of machinery in which they are utilized. However, during assembly of such machinery the wear rings of the unitized seals are often incorrectly positioned relative to the embracing seal lips. Indeed, sometimes the metal wear ring is displaced to such an extent that it interferes with the seal case to which the elastomeric seal element is bonded, and this produces excessive heat and undesirable noise. Moreover, if a wear ring is displaced too much it may prevent lubricants from reaching the surface thereof which is engaged by the seal lips, and when this occurs the lips overheat and become brittle.

Furthermore, many unitized seals, by reason of the fact that they are unitized, are more enclosed than separable seal constructions, and this retards the circulation of air adjacent to their heat generating surfaces. In the absence of sufficient air circulation, heat is not dissipated rapidly enough from the seal construction and as a result the elastomeric components overheat and harden. Hard seals, of course, do not possess the sealing ability of pliable seals.

SUMMARY OF THE INVENTION

One of the principal objects of the present invention is to provide a unitized seal assembly having a wear ring which remains properly positioned relative to an encircling seal case and elastomeric seal element during assembly of the construction incorporating the seal. Another object is to provide a unitized seal assembly in which the sealing surface of the wear ring receives ample lubrication to prevent the elastomeric seal element from overheating. A further object is to provide a seal assembly of the type stated which rapidly dissipates heat generated by the frictional engagement of the elastomeric seal lips with the wear ring. An additional object is to provide a unitized seal assembly which is simple in construction and easy to manufacture. Still another object is to provide a unitized seal assembly which is easily installed on shafts and in housings encircling such shafts.

The present invention is embodied in a unitized seal assembly having a seal case provided with a pair of spaced retaining walls. A wear ring is captured between the retaining walls and is properly located by bumper rings interposed between the sides of the wear ring and the retaining walls. An elastomeric seal element is attached to the seal case and includes at least one lip which engages the wear ring. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
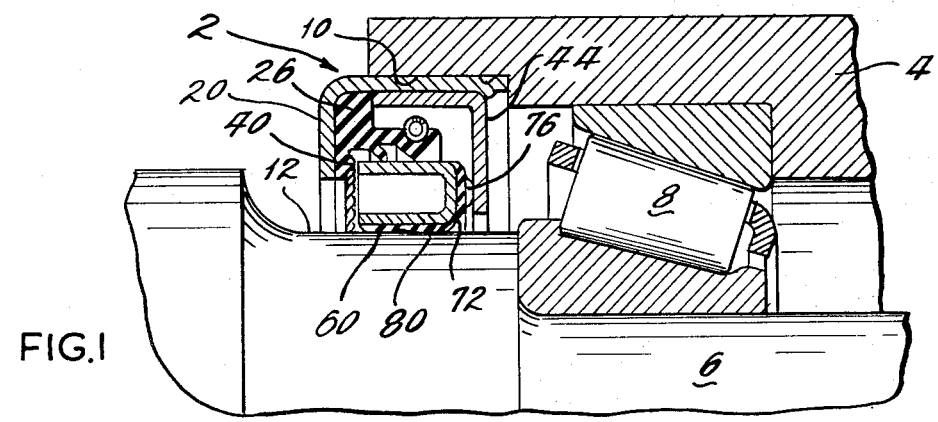
FIG. 1 is a fragmentary sectional view of a shaft journal sealed by a unitized seal assembly constructed in accordance with and embodying the present invention.

Referring now in detail to the drawings, 2 designates a unitized seal assembly which establishes a barrier between a housing 4 (FIG. 1) and a shaft 6 journaled in the housing 4 by means of a tapered roller bearing 8. The seal assembly 2 not only retains lubricants for the bearing 8 within the housing 4, but also keeps dust, water, and other contaminants out of the housing 4 so they will not harm the bearing 8. Beyond the bearing 8 the housing 4 is provided with an outwardly opening counterbore 10 which surrounds an unobstructed cylindrical surface 12 in the shaft 6.

The unitized seal assembly 2 (FIG. 2) includes a seal case 20 which is preferably stamped from steel and has a cylindrical outer wall 22 which is press fitted into the counterbore 10 of the housing 4 so that the seal case 20 is secured to the housing 4. At its outboard end the outer wall 22 merges into an inwardly turned retaining wall 24 which projects radially inwardly toward the shaft 6.

The seal case 20 carries an elastomeric seal element 26 including a mounting portion 28 which bonded to the inwardly presented surfaces of both the radial retaining wall 24 and the cylindrical outer wall 22. The seal element 26 further comprises a large fluid-sealing or primary lip 30, and a smaller dust-sealing lip 32, both of which are molded integral with the mounting portion 28. The lip 32, being primarily for the purpose of excluding external contaminants from the bearing 8, is disposed outermost or in other words, is located closer to the radial retaining wall 24 of the seal case 20. The fluid sealing lip 30, on the other hand, is set further inwardly, and on its outer side is provided with an outwardly opening groove 34 into which a garter spring 36 is fitted for urging it inwardly.

Figure 3:
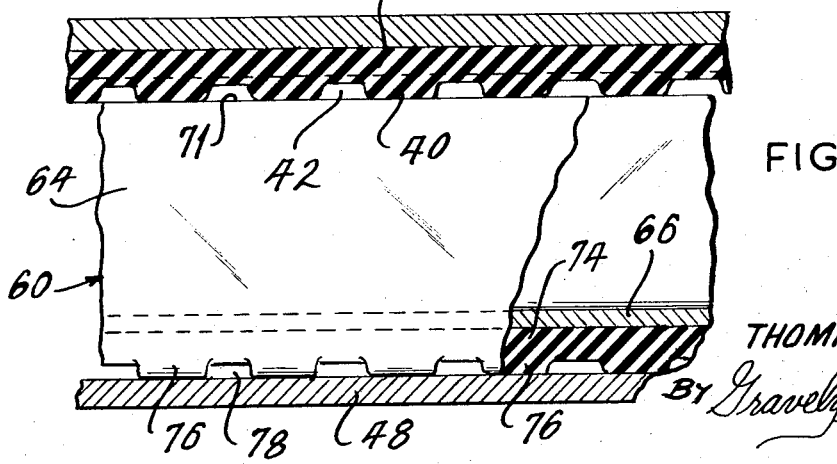
FIG. 3 is a fragmentary sectional view taken along line 3—3 of FIG. 2.

Also molded integral with the mounting portion 28 and bonded to the retaining wall 24 is a bumper ring 38 which extends radially inwardly to the inner edge of the wall 24. The bumper ring 38 is provided with a series of circumferentially spaced bumper pads 40 (FIG. 3) which project laterally or axially toward the lips 30 and 32 but are located further inwardly toward the shaft 6. Each pad 40 is formed integral with the ring 38 and is separated from its adjacent pad by a radially extending void 42.

The seal case 20 further includes retainer 44 having a cylindrical mounting wall 46 and a radial retaining wall 48 formed integral with each other. The cylindrical mounting wall 46 fits snugly into the cylindrical outer wall 22, and when so fitted its end edge abuts the mounting portion 28 of the elastomeric seal element 26. This disposition of the mounting wall 46 positions the radial retaining wall 48 axially inwardly from the large fluid sealing lip 30 on the seal element 26 and from the outer retaining wall 24 also. Indeed, the spaced retaining walls 24 and 48 coupled with the cylindrical outer wall 22 form an annular cavity about the shaft 6, and that cavity contains the elastomeric seal element 26 and its sealing lips 30 and 32. The inner edge of the radial retaining wall 48 is disposed considerably closer to the cylindrical surface 12 on the shaft 6 than is the inner edge of the radial retaining wall 24, yet a clearance still exists between that end edge and the shaft 6 so that the two do not contact each other. The retainer 44 is secured in and made a fixed part of the seal case 20 by means of staking 50 formed in the cylindrical outer wall 22 adjacent to the juncture the retainer walls 46 and 48. Consequently, the radial retaining wall 48 will not move axially away from the radial retaining wall 24.

Fitted over the shaft 6 for rotation therewith is a wear ring 60 which projects radially into the space between the retaining walls 24 and 48 and is accordingly confined axially by those walls 24 and 48. Within the space between the retaining walls 24 and 48 the wear ring 60 is engaged by the sealing lips 30 and 32.

More specifically, the wear ring 60 is preferably a steel stamping and includes spaced inner and outer cylindrical walls 62 and 64 which are joined at their ends disposed closest to the retaining wall 48 by an integrally formed radial connecting wall 66, thus forming an annular cavity 68 which opens outwardly of the housing 4 adjacent to the outer retaining wall 24 on the seal case 20. The outer cylindrical wall 64 has an outwardly presented wear surface 70 which is engaged by the lips 30 and 32 of the seal element 26 so that as the wear ring 60 rotates relative to the seal case 20 a lubricant and dust barrier is established at the seals 30 and 32, respectively. The outer cylindrical wall 64 is furthermore positioned such that it is free or axial outer edge 71 is located directly opposite from the bumper pads 40 on the bumper ring 38 of the elastomeric seal element 26. The connecting wall 66, on the other hand, is located opposite to the radial retaining wall 48 on the retainer 44.

Figure 2:
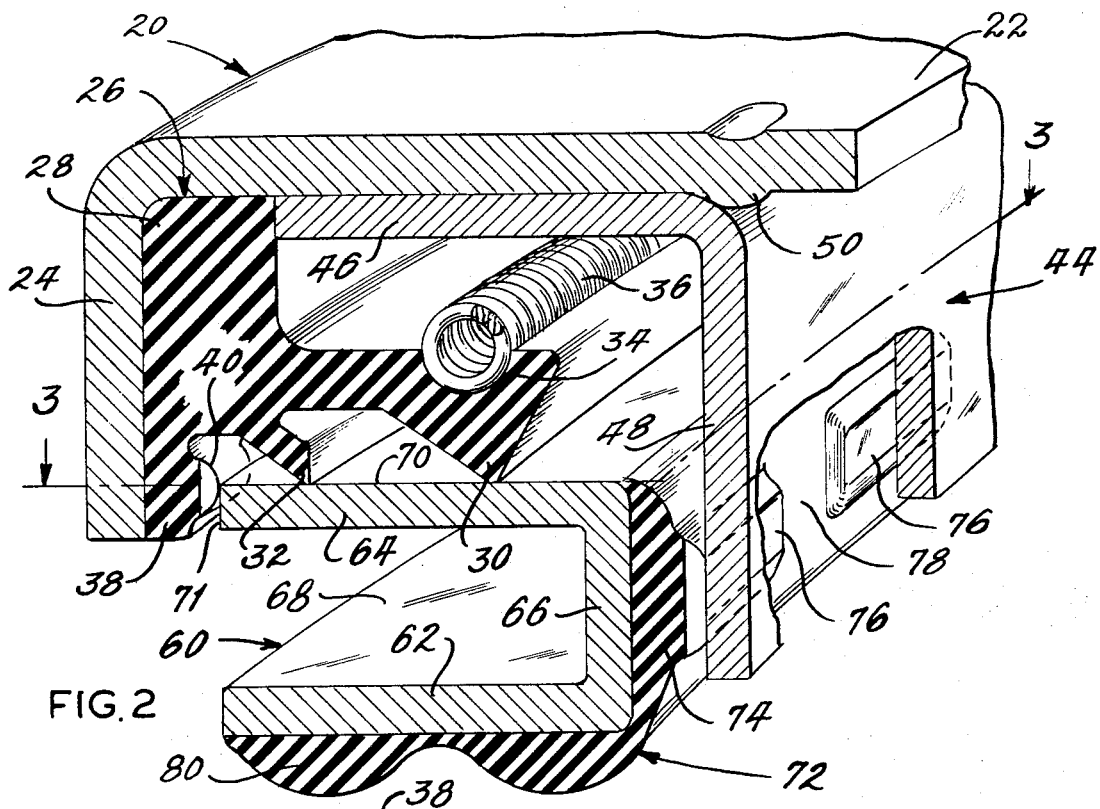
FIG. 2 is an enlarged fragmentary perspective view, partially broken away and in section, of the seal assembly.

Attached to the cylindrical inner wall 62 and the connecting wall 66 of the wear ring 60 is an elastomeric element 72 including an annular bumper ring 74 which is bonded to the surface of the connecting wall 66 and is provided with a series of circumferentially spaced bumper pads 76 located opposite to inner retaining wall 48. The bumper pads 76 are separated by radial voids or lubrication channels 78 which enable lubricant contained within the housing 4 to flow radially outwardly to the wear surface 70 on the outer wall 64. The elastomeric element 72 also includes a gripping portion 80 which is bonded to the inner cylindrical wall 62, and possesses an undulated inner surface when not deformed (FIG. 2). The gripping portion 80 fits over and engages the cylindrical surface 12 on the shaft 8 and is sized such that it experiences significant distortion when so fitted (FIG. 1), thus losing its undulated configuration. This creates a secure grip on the cylindrical surface 12 or, in other words, enables the gripping portion 80 to tightly embrace the shaft 6 so that the wear ring 60 will rotate with the shaft 6.

Assembly of the housing 4, shaft 6, bearing 8 and unitized assembly 2 into an operational journal construction involves a very simple procedure. In particular, after the bearing 8 is installed in the housing 4, the seal case 20 of the unitized seal assembly 2 is press-fitted into the counterbore 10 with the retaining walls 24 and 48 presented axially outwardly and inwardly, respectively. Then the shaft 6 is advanced axially through the wear ring 60 and bearing 8. Initially the shaft will advance without any appreciably resistance from the gripping portion 80, but once the cylindrical shaft surface 12 encounters the gripping portion 80 further advancement can only be achieved by distorting the undulated configuration of the gripping portion 80. This, of course, requires that a discernible axial force be applied to the shaft 6, and a corresponding counterforce to the housing 4. The force is transferred between the wear ring 60 and the seal case 20 at the bumper pads 76. In other words, as the cylindrical surface 12 of the shaft 6 slips across the gripping portion 80, the pads 76 will maintain the wear ring 60 in a generally centered position between the retaining walls 24 and 48.

Once the shaft 6 reaches its correct axial position, the inside face of the radial retaining wall 48 will be pressed against the bumper pads 76, and the pads 76 will be distorted slightly. Nevertheless, during a short run in period the distorted pads 76 will wear and will for all practical purposes no longer engage the retaining wall 48 so that after the run in period the formally distorted pads 76 will not offer resistance to rotation of the seal case 20 relative to the wear ring 60.

Should the wear ring 60 be displaced toward the retaining wall 24, after installation, the other set of bumper pads 40 will engage the end edge 71 of the outer cylindrical wall 64 and prevent the wear ring from leaving the confines of the seal case 20. In other words, the bumper pads 40 serve to maintain the wear ring 60 centered in the seal case 20. Of course, if the shaft 6 during installation in the bearing 8 and seal assembly 2 were advanced in the direction opposite to that previously described, the axial force would be transferred through the seal assembly at the abutment of the bumper pads 40 and end edge 71 on the wear ring outer wall 64.

The voids or lubrication channels 78 between the bumper pads 76 enable the lubricant contained within the housing 4 for lubricating the bearing 8 to flow outwardly onto the wear surface 70 of the outer cylindrical wall so as to provide a thin film of lubricant between the lips 30 and 32 and the surface 70. This reduces the friction between the lips 30 and 32 and the surface 70, and thereby prevents the elastomeric element 26 from overheating and hardening. Thus, the elastomeric element 26 remains pliable and the lips 20 and 32 maintain their sealing ability for extended periods of time.

Aging or hardening of the elastomeric seal element 26 is further diminished by the presence of the annular cavity 68 in the wear ring 60. This cavity enables cool air from outside the housing 4 to flow across the inwardly presented surface of the outer cylindrical wall 64 and thereby rapidly dissipate the heat generated by the frictional engagement between the sealing lips 30 and 32 and the wear surface 70 on the opposite side of that wall.

In lieu of press fitting the seal case 20 in the housing 4, the seal case may be secured to the housing 4 by bonding with an adhesive, by a locking ring or other integral device, by a snap ring or other separable device, or by bolts, screws or entrapment. Moreover, the gripping portion 80 of the elastomeric element 72 may be eliminated and the inner wall 62 of the wear ring press fitted directly over the cylindrical surface 12 on the shaft 6.

Figure 4:
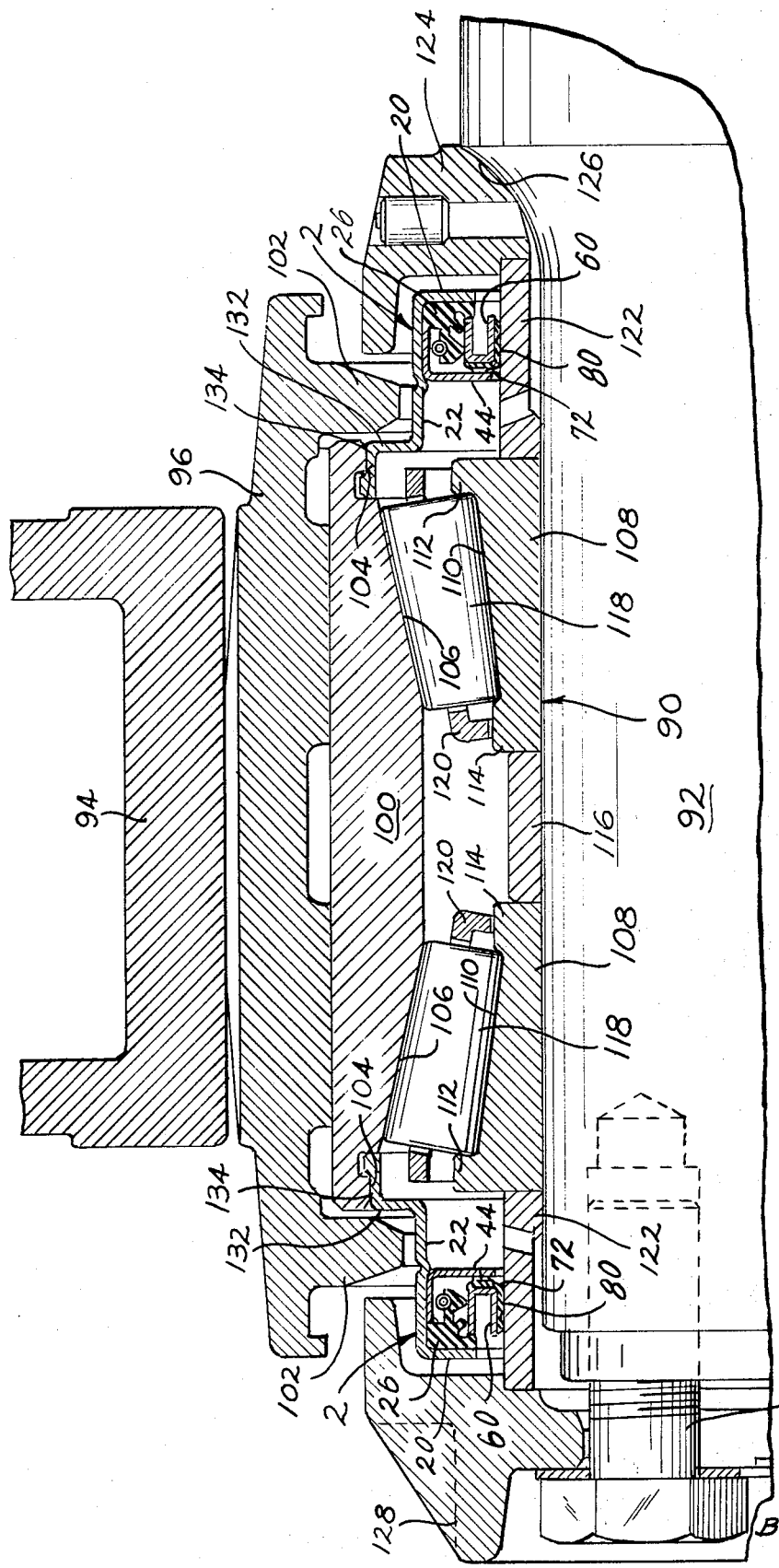
FIG. 4 is a longitudinal sectional view of an all-purpose bearing fitted with unitized seal assemblies of the present invention.

The unitized seal assembly 2 with minor modifications is ideally suited for use in all purpose bearings 90 (FIG. 4). These bearings are widely used in the railroad industry and are often supplied in a cartridge-like package for replacing the old sleeve bearings and journal boxes in rolling stock. When utilized for railroad applications, the all-purpose bearing 90 is normally found at and indeed forms the journal between a car axle 92 and a truck side frame 94. In most cases, the all purpose-bearings 90 is fitted to the side frames by means of an adapter 96.

The all-purpose bearing 90 includes a double cup 100 having an outwardly presented cylindrical surface which fits against a complementary seat on the adapter 96. To prevent the cup from shifting axially relative to the adapter 96, the latter is provided with inwardly projecting flanges 102 at its ends, and the cup 100, of course, fits between the flanges 102. At each end the cup 100 is provided with outwardly openings counterbores 104 which open toward the flanges 102 on the adapter 96. The cup 100 is further provided with a pair of inwardly presented tapered raceways 106.

In addition to the cup 100, the all-purpose bearing 90 includes a pair of cones 108 which encircle the ends of the axle 92, and each cone 108 has a tapered raceway 110 presented directly inwardly from one of the cup raceways 106. At its large diameter end the cone raceway 110 is rimmed by a thrust rib 112 and at its small diameter end it is bounded by a retaining rib 114. The correct spacing between the two cones 108 is provided by a cone spacer 116 which encircles the axle 92 between them.

Fitted between and engaged with the opposed raceways 106 and 110 of the cup 100 and cones 108, respectively, are a series of tapered rollers 118 which naturally are arranged in two rows and form part of the bearing 90. In this connection, it should be noted that the length or axial dimension of the cone spacer 116 is such that the radial clearance between the rollers 118 and the raceways 106 and 110 is within prescribed tolerances.

The proper circumferential spacing between the tapered rollers 118 in each row is maintained by a cage 120 which is also disposed between the raceways 106 and 110, but does not engage either one of them. The cages 120 also prevent the rollers 118 from departing their respective cones 108 when the cones 108 are removed from the cup 100.

The outwardly presented end of each cone 108 abuts against a sleeve 122 which encircles the axle 92. The inboard sleeve 122 further abuts against a backing ring 124, which in turn abuts against a shoulder 126 on the axle 92. The outboard sleeve 122, on the other hand, abuts against an end cap 128 which covers the end of the axle 92 and is secured to the axle 92 by means of cap screws 130. Indeed, the cap screws 130 draw the end cap 128 toward the end of the axle 92 and in so doing clamp the outboard sleeve 122, the outboard cone 108, the cone spacer 116, the inboard cone 108, the inboard sleeve 122 and the backing ring 124, in that order, between the end cap 128 and the axle shoulder 126. The cup 100, of course, surrounds the cone 108 and cone spacer 116. When the bearing 90 is so assembled on the car axle 92, the flanges 102 on the ends of the adapter 96 project toward the wear rings 122, in which case one flange 102 is disposed between the end cap 128 and the outboard end of the cup 100 while the other flange is disposed between backing ring 124 and the inboard end of the cup 100.

The all-purpose bearing 90 utilizes two unitized seal assemblies 2—one at each end of the cup 100. To adapt the seal assembly 2 to the all-purpose bearing 90 the seal case 20 is modified slightly, and that modification embodies a radially directed wall 132 formed integral with the cylindrical outer wall 22 and projecting outwardly therefrom and an axially directed wall 134 connected to the radial wall 132 at its periphery and projecting axially therefrom away from the cylindrical outer wall 22. The axially directed walls 134 of the two seal assemblies 2 are press fitted into the counterbores 104 of the cup 100 and this positions the seal elements 28 and the wear rings 60 directly over the sleeves 122 abutting the ends of the cones 108. Indeed, the undulated gripping portions 80 encircle and snugly embrace the sleeves 122 so that the wear rings 60 rotate with the sleeves 122 and the axle 92.

When the axially directed walls 134 are inserted to their fullest extent into the counterbores 104, the radially directed walls 132 are positioned generally flush with the two end faces of the cup 100, and accordingly they do not interfere with the flanges 102 on the adapter 96. Moreover, the cylindrical outer wall 22 is positioned far enough inwardly to avoid interference with the adapter flanges 102.

To assemble the journal assembly into which the all purpose bearing 90 is incorporated, the axially directed end walls of the modified seal case 20 are first press fitted into the counterbores 104 of the cup 100. Then the backing ring 124 is fitted over the axle 92 and brought against the shoulder 126 thereon. Next, the inboard sleeve 122 passed over the axle 92 and fitted against the backing ring 124.

With the backing ring 124 and inboard sleeve 122 in place, the bearing 90 with the seal assemblies 2 fitted to it is passed as a unit or cartridge over the axle 92, in which case the cones 108 and cone spacer 116 will directly engage and slide along the surface of the axle 92. As the bearing 90 is advanced toward the backing ring 124, the undulated gripping portion 80 of the inboard seal assembly 2 will engage the inboard sleeve 122, whereupon additional force is applied to the bearing 90 in order to advance the gripping portion 80 across the outer surface of the sleeve 122. This causes the bumper pads 76 to compress slightly against the radial wall 48 of the retainer 44, but it still maintains the wear ring 60 in a generally centered portion between the radial walls 24 and 48. The bearing 90 is advanced until its inboard cone 108 abuts against the inboard wear ring 122. Thereafter the outboard wear ring 122 is passed over the end of the axle 92 and forced under the undulated gripping portion 80 on the wear ring 60 of the outboard seal assembly 2 until the sleeve 122 abuts the outboard cone 108. Again the bumper pads 76 of the outboard seal assembly 2 are compressed against the radial wall 48, and yet maintain the wear ring 60 generally centered between the walls 24 and 48.

Once the outboard sleeve 122 is in place, the end cap 128 is fitted against it and the cap screws 130 are threaded into the end of the shaft 92. Finally, the cap screws 130 are tightened and this clamps the backing ring 124, the sleeves 122, the cones 108, and the cone spacer 116 between the end cap 128 and the shoulder 126 of the axle 92. Since the raceways 106 and 110, along with each row of rollers 118 roll, taper in opposite directions the cup 100 is confined axially and the all-purpose bearing 90 is capable of transferring thrust in either axial direction.

The unitized seal 2 when modified for use with the all-purpose bearing 90 functions in the manner previously described. More specifically, during the initial run-in period the bumper pads 76 wear slightly, but never to the extent that they are completely obliterated. Consequently, grease from the interior of the bearing 90 finds its way to the wear surface 70 where it lubricates the sealing lips 30 and 32 and prevents the seal element 24 from overheating. The annular cavities 68 in the wear ring 60 face or open outwardly and consequently fresh air circulates through them and dissipates heat generated by reason of the engagement of the sealing lips 30 and 32 with the wear surface 70 on the ring 60.

This invention is intended to cover all changes and modifications of the example of the invention herein chosen for purposes of the disclosure which do not constitute departures from the spirit and scope of the invention.

What is claimed is:

1. A unitized seal assembly for establishing a barrier between a shaft and a structure surrounding the shaft, said seal assembly comprising: a seal case attached to the surrounding structure and having first and second spaced retaining walls which encircle the shaft, an elastomeric seal element attached to the case between the retaining walls and having at least one sealing lip; a first bumper ring formed integral with the seal element and attached to the first retaining wall, the first bumper ring projecting radially inwardly beyond and being positioned axially from the lip; a wear ring attached to the shaft and extending outwardly beyond the inner margins of the retaining walls so that it is captured between the retaining walls, the wear ring including inner and outer radially spaced walls and a connecting wall extending between the inner and outer walls, whereby an air space exists between the walls, the outer wall having an outwardly presented wear surface engaged and embraced by the lip, the wear ring further having an end edge located at the end of the wear surface and positioned opposite to the first bumper ring; and a second bumper ring bonded to the wear ring and interposed between the wear ring and the second retaining wall, whereby the bumper rings maintain the wear ring in the proper position between the retaining walls during installation and operation of the seal assembly.

2. A seal assembly according to claim 1 wherein at least one of the bumper rings is provided with a series of circumferentially spaced bumper pads to enable a lubricant to flow past that bumper ring and lubricate the wear ring surface which is engaged by the sealing lip.

3. A seal assembly according to claim 1 wherein the second bumper ring is provided with a series of circumferentially spaced bumper pads to enable a lubricant to flow past the second retaining wall and bumper ring and lubricate the wear ring surface which is engaged by the sealing lip.

4. A seal assembly according to claim 1 wherein the end edge which is located opposite to the first bumper ring is on the outer wall; and wherein the connecting wall is located adjacent to the second retaining wall and has the second bumper ring attached to it.

5. A seal assembly according to claim 4 wherein the second bumper ring is provided with a series of circumferentially spaced bumper pads separated by radially extending voids to enable a lubricant to flow past the second bumper ring and lubricate the wear surface.

6. A seal assembly according to claim 5 wherein an elastomeric gripping segment is bonded to the inner wear ring and projects radially inwardly beyond the inner wall, the gripping segment tightly embracing the shaft for securing the wear ring thereto.

7. A seal assembly according to claim 6 wherein the gripping segment is bonded to the inner wall of the wear ring and possesses an undulated inner surface when free of and not distorted by the shaft.

8. A seal assembly according to claim 5 wherein the seal case comprises an outer wall formed integral with the first retaining wall, and an inner wall fitted snugly inside the outer wall and formed integral with the second retaining wall; wherein the outer wall is secured to the structure surrounding the shaft; and wherein the elastomeric seal element is bonded to the first retaining wall and to the outer case wall.

9. A seal assembly according to claim 4 wherein both bumper rings are provided with a series of circumferentially spaced bumper pads.

10. A unitized seal assembly for installation between a shaft and a structure surrounding the shaft to retain a lubricant within the surrounding structure, said seal assembly comprising: a seal case attached to the surrounding structure and having a pair of axially spaced retaining walls which encircle the shaft; a wear ring attached to the shaft and having side surfaces facing the retaining walls on the seal case, the wear ring further having inner and outer radially spaced walls and a connecting wall extending between and interconnecting the inner and outer walls so that an air space exists between the inner and outer walls, the outer wall having an outwardly presented wear surface thereon presented in the interior of the seal case and being located between the retaining walls of the seal case so that the wear ring is axially confined by the seal case, an elastomeric seal bonded to the seal case and having a sealing lip engaged with the wear surface on the outer wall of the wear ring; a first elastomeric bumper ring bonded to one of the retaining walls and presented opposite to one of the side surfaces of the wear ring; and a second elastomeric bumper ring bonded to another side surface of the wear ring and presented opposite to the other retaining wall of the seal case, whereby the bumper rings maintain the wear ring in the proper position between the retaining walls of the seal case during installation and operation of the seal assembly.

11. A seal assembly according to claim 10 wherein the outer wall of the wear ring is connected to the connecting wall at one of its ends and has an end edge at its opposite end, the side surface opposite the first elastomeric bumper ring being on the end edge and the side surface to which the second elastomeric bumper ring is bonded being on the connecting wall.

12. A seal assembly according to claim 10 wherein the elastomeric bumper rings have raised bumper pads separated by voids to enable lubricants to flow outwardly to the wear surface of the outer wall.

* * * * *